Dec. 15, 1964    A. E. BERGQUIST    3,161,007
FRUIT PICKING APPARATUS
Filed May 9, 1962    3 Sheets-Sheet 3
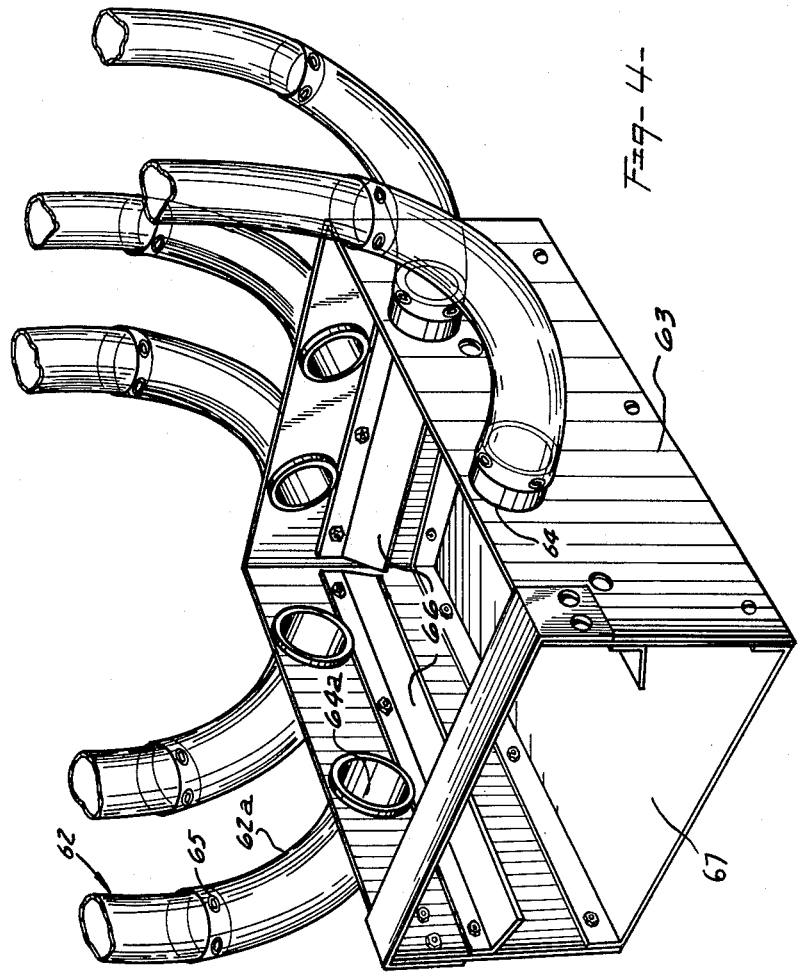
INVENTOR.
ARTHUR E. BERGQUIST
BY Everett J. Schroeder
Kenneth A. Siegfried
ATTORNEYS

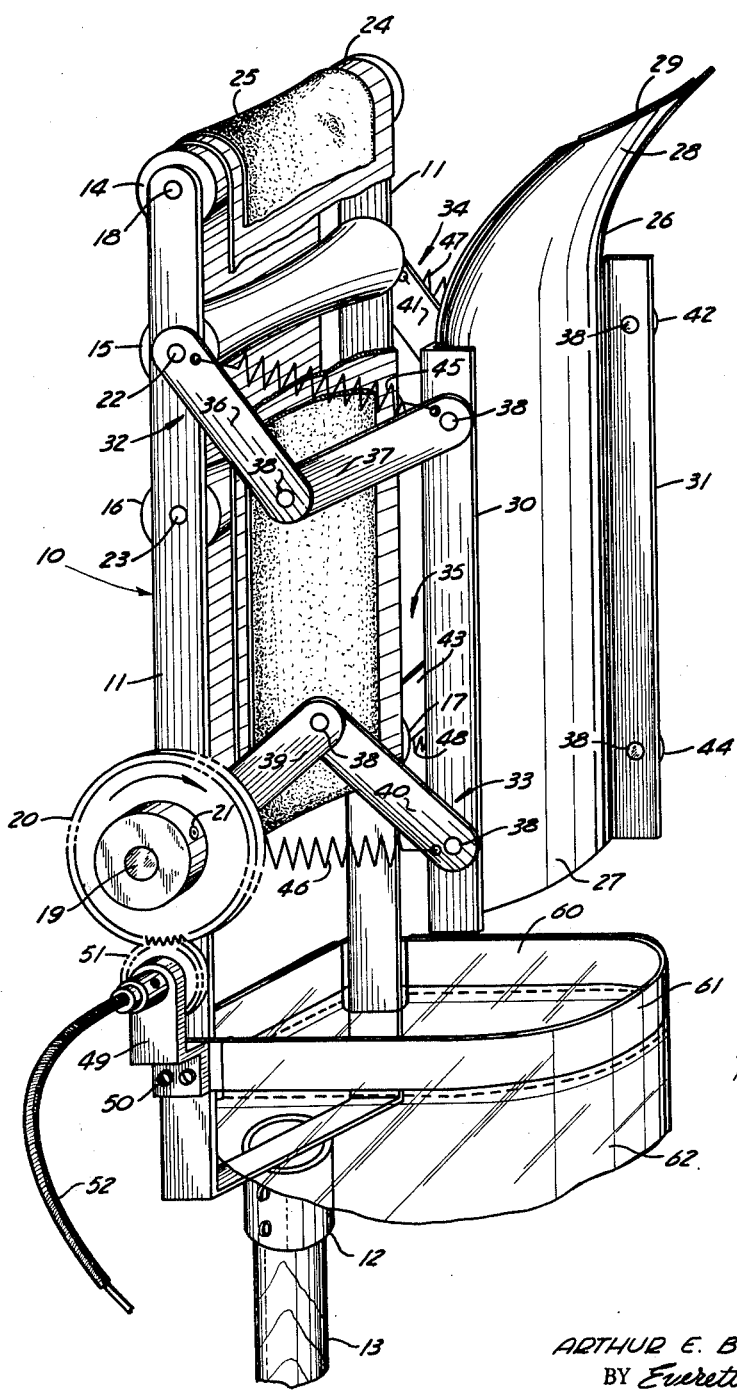

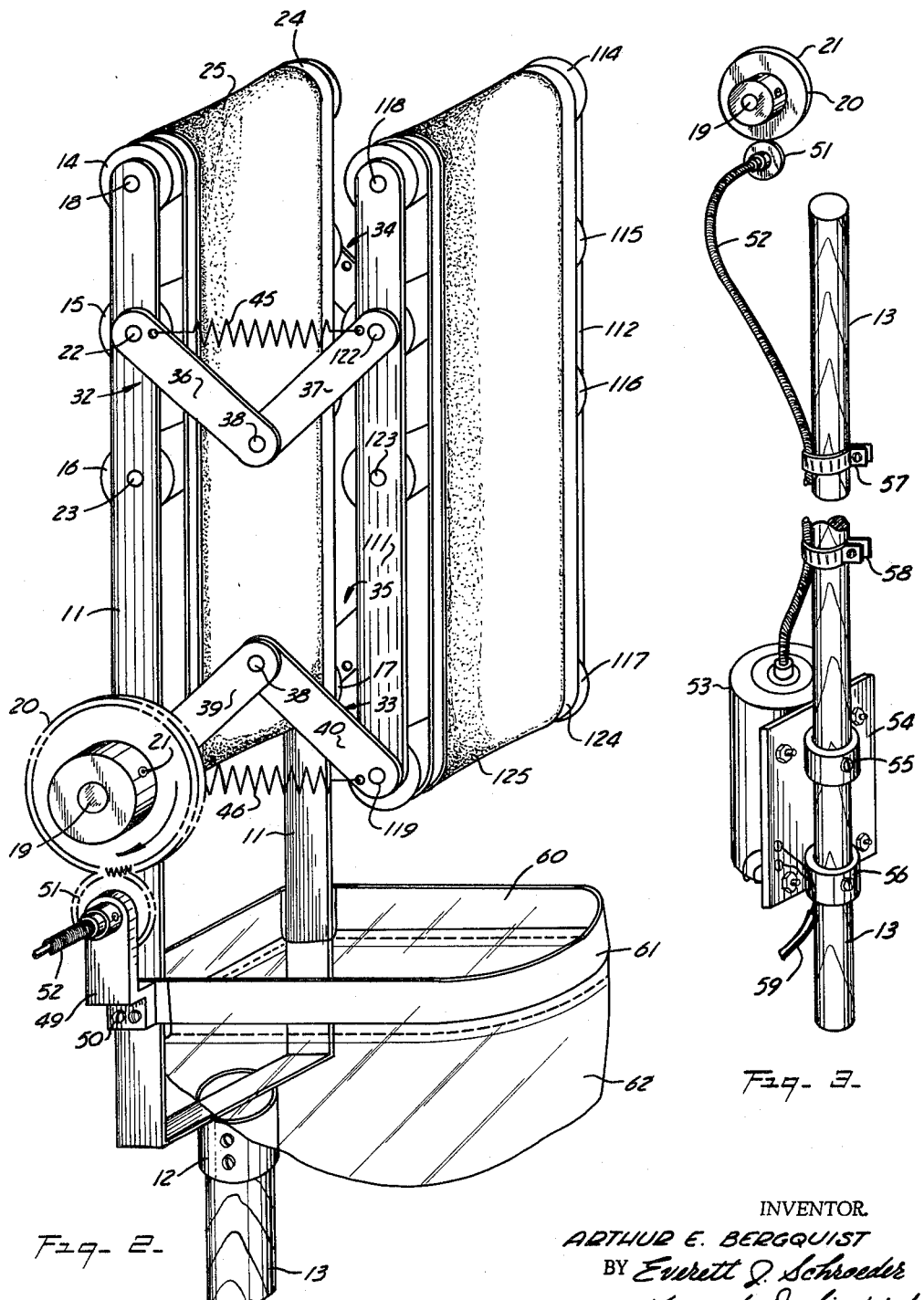

United States Patent Office 3,161,007
Patented Dec. 15, 1964

3,161,007
FRUIT PICKING APPARATUS
Arthur E. Bergquist, Lindstrom, Minn.
Filed May 9, 1962, Ser. No. 193,566
15 Claims. (Cl. 56—332)

This invention relates to the field of fruit harvesting apparatus and more particularly to the field of apparatus for picking fruit from a tree.

One of the most important problems facing the fruit industry, is the problem of increased cost due to labor needed for harvesting the fruit. Several attempts have been made to mechanize the picking processes but for the most part have not proven to be too satisfactory for the simple reason that the fruit generally receives more bruises and is damaged to a greater extent than when the fruit is picked by hand. Of course the picking process, when done by hand, generally requires that the picker stand upon supports or ladders to move around the tree and the ladders and supports must be constantly moved to put the operator in the most advantageous position for picking the fruit in the different localities about the tree. This is an obvious disadvantage even though the fruit may be picked by hand.

One attempt at mechanizing the picking process has been the use of a shaking device which is applied to the fruit tree to vibrate the tree and cause the fruit to fall upon the ground. Such a method of harvesting automatically bruises the fruit and therefore is highly undesirable, especially in the marketing of fresh fruit. Also, most of the mechanical pickers which are presently being used are designed to pick fruit of one type and generally of a size which varies very little. Using that type of apparatus, different devices must be kept on hand to pick fruit of different sizes or must be adjusted to take care of fruit of significant changes in size and shape.

My invention contemplates an apparatus which may be supported on the end of a long pole so that the fruit may be harvested by the operator standing upon the ground without the use of ladders or supports. The apparatus is also constructed so that fruit of various sizes may be harvested at one time. In fact, a particular embodiment of the present invention allows fruit varying in size from two inches to approximately three and three quarter inches in diameter to be picked by the same apparatus without any adjustment by the operator. In other words, the picker adjusts itself automatically to the different sizes and contours of the fruit to be picked. In one embodiment of the invention, where the fruit has a generally spherical shape, the stems of the fruit are snapped from the tree by a rolling action about an axis transverse to the direction of the stem of the fruit. By using a slight modification of the invention, fruits such as pears, avocadoes, or others having a generally oblong shape may be picked without tumbling or rotating the fruit end over end and thereby insure that the fruit is picked with a minimum amount of damage. It is contemplated that a picker of the type disclosed herein may be used to pick fruits such as apples, oranges, pears, peaches, apricots, avocadoes, and others, the aforementioned fruits not being all inclusive as to the different types of fruit which may be picked. It is also contemplated that the present invention has a chute or enclosed conveying structure which will allow the fruit to be conveyed to the ground and by a novel container arrangement, the fruit may be easily boxed or packaged. It is also contemplated that several picking devices may be used in conjunction with a single container to speed up the boxing process when moving the fruit from the picking area to the packing area.

It is therefore a general object of the present invention to provide an improvement in apparatus for picking fruit from a tree.

It is still another object of the present invention to provide new and novel apparatus for picking fruits of different sizes and shapes.

It is yet another object of the present invention to provide picking apparatus with automatic adjustment to the different sizes of fruit to be picked.

It is still a further object of this invention to provide a power driven apparatus for picking fruit from a tree.

It is yet another object of this invention to provide apparatus for guiding such fruit picked from the tree to the ground with a minimum amount of bruising to the fruit.

It is still another object of this invention to provide apparatus for snapping the stems of fruit from the tree during the picking operation.

It is yet another object of this invention to provide new and novel apparatus using conveying type belts with a concave shape to aid in picking fruit from a tree.

It is still another object of this invention to provide new and novel apparatus which has means adjusable in length for guiding the fruit to the ground from the tree.

It is still another object of the present invention to provide apparatus for use on a long handle to guide fruit to an improved container for receiving the fruit on the ground.

It is yet another object of the present invention to provide an improved container to contain fruit on the ground picked by a plurality of mechanical pickers on extensible handles.

These and other objects and advantages of my invention will more fully appear from the following description, made in connection with the accompanying drawings, wherein like reference characters refer to the same or similar parts throughout the several views, and in which:

FIG. 1 is an isometric view of the mechanical picker mounted upon a handle;

FIG. 2 is a modification of the picker as shown in FIG. 1;

FIG. 3 is a drawing of the motor arrangement where power is supplied to the mechanical picker through a flexible shaft; and FIG. 4 shows an improved container used in conjunction with the mechanical picker.

A mechanical picker 10 is shown in FIG. 1 which has a U shaped elongated bracket 11 with a handle engaging portion 12 located at the bottom of the closed end of the U shaped bracket. Situated within the handle engaging portion 12, is a handle 13 which may be made in one piece or in sections so that the handle is readily extensible to different lengths. Situated within the elongated members of the U shaped bracket 11 are a plurality of concave shaped rollers 14, 15, 16, and 17. Roller 14 is situated near the upper end of the two elongated members of bracket 11 and is rotatably supported therebetween by a pin or other suitable element 18. Roller 17 which is also concave shaped is located near the bottom of the U shaped bracket 11 and is rotatably supported between the bracket members by a shaft 19. Shaft 19 is fixedly fastened to concave shaped roller 17 so that power may be applied thereto through a gear 20 which is attached to shaft 19 by suitable means such as a screw 21. Roller 15 is shown in detail showing the concave shape and arrangement of the roller and is disposed vertically downwardly from roller 14 where it is supported in rotatable fashion by a shaft 22 which extends between the elongated members of U shaped bracket 11. It has been determined that an operable device may be made by spacing the rollers approximately one and three quarters to two inches apart where the diameter of the rollers at the narrowest portion is approximately one-half to two-thirds of the diameter of the roller at the outer edges. In fact, rollers 14 and 15 should be spaced vertically a distance no greater than the smallest diameter of the fruit to be picked so that maximum gripping of the fruit is obtained during the snapping or initial picking operation. Roller 16 is located approximately the same distance from roller 15 as the distance from roller 14 to 15. Roller 16 is rotatably supported upon a shaft 23 which extends parallel to the shafts 18 and 22 between the upright members U-shaped bracket 11.

A rubber belt 24 encircles rollers 14 and 17 at the ends of its travel and also encircles rollers 15 and 16. In other words, rollers 14 and 17 form the outer extremities upon which belt 24 is rotated. Belt 24 is so designed that it will conform to the concave shape of the rollers and thus provide a concave surface. Fixedly fastened to belt 24, by suitable means such as cement, is a thin layer of sponge rubber 25 or any other soft resilient material having a non-skid surface to aid in the picking and snapping operation of removing the fruit from the tree. The sponge rubber material 25 also provides an additional cushioning effect to provide minimum damage to the fruit being picked. Belt 24 and sponge rubber material 25 is shown in a broken section in FIG. 1 so that the general contour and shape of the rollers such as roller 15 may be observed.

An elongated guide member 26 is formed of suitable material such as aluminum or any other readily deformable material to provide a concave portion 27 which extends longitudinally about the center of the elongated guide member. That is, there is a concave surface provided by the elongated member 26. The upper portion of elongated guide member 26 contains a flared out section 28 to aid in grasping the fruit at the start of the picking operation. Cemented to the concave surface of elongated guide member 26 and opposite belt 24 and sponge rubber strip 25, is a sponge rubber strip 29 which is also disposed longitudinally about the central concave surface. In other words, sponge rubber strips 25 and 29 are opposite each other and form a concave surface in each member so that the fruit while passing therebetween will remain centrally located within the concave portion. Each side of elongated guide member 26 has a rearwardly depending portion or side 30 and 31.

Four linkages 32, 33, 34, and 35 are used to connect elongated guide member 26 to the elongated elements of U-shaped bracket 11. Linkage 32 comprises a pair of equal length arms 36 and 37 which are pivotally connected together at one of their ends by suitable means such as a screw or rivet 38. The other end of arm 36 may be connected to elongated member 11 through shaft 22 or may be pivotally connected to elongated member 11 of the U-shaped bracket at a position adjacent the shaft 22 by separate rotatable supporting means. The other end of arm 37 is connected to the depending side 30 of elongated guide member 26 by suitable means such as a screw or rivet 38. In like manner, linkage 33 comprises a pair of equal length arms 39 and 40 which are connected at one of their ends by pivotal means such as a rivet or screw 38. The other end of arm 39 is pivotally connected to shaft 19 or adjacent thereto by suitable means such as screws or rivets 38 and the other end of arm 40 is connected to the depending side portion 30 of elongated guide member 26 by suitable means such as a rivet or screw 38. It has been found that best results are obtained where the two linkages move towards each other when the distance between elongated guide member 26 is decreased with respect to elongated bracket 11. In other words, when viewed from the side, arms 36 and 37 are V-shaped and arms 39 and 40 are like an inverted V. In like manner, linkage 34 comprises a pair of arms 41 and 42 which are identical to arms 36 and 37 and perform the same function and are connected in the same manner as arms 36 and 37. Linkage 35 comprises a pair of arms 43 and 44 which are identical to arms 39 and 40 and perform the same function and are connected in the same manner as arms 39 and 40.

Four spring elements 45, 46, 47, and 48 are connected adjacent the pivot points of arms 36 and 37, 39 and 40, 41 and 42, and 43 and 44 respectively. In other words, springs 45, 46, 47, and 48 are attached to their respective arms to urge elongated guide member 26 towards U-shaped elongated bracket 11 and do so by urging the outer pivot points of the arms towards each other. It should be obvious that the springs may also be attached directly to the side members 30 and 31 of elongated guide member 26 on one side and to elongated bracket element 11 on the other side.

To provide power to the belt 24 through shaft 19 and roller 17, a bracket 49 is fixedly fastened to elongated member of U shaped bracket 11 by suitable means such as screws 50 and rotatably supports a gear 51 in driving relation with gear 20. Gear 51 is driven through a flexible shaft 52 or by direct drive shaft means (not shown) from a motor 53. Motor 53 is fastened to a mounting board 54 which in turn is connected to handle 13 by suitable means such as a pair of collars 55 and 56. Situated between driving gear 51 and motor 53 is a pair of clamps 57 and 58 which are used to keep the flexible shaft located substantially parallel to the handle to avoid entanglement of the driving shaft with the branches of the tree from which the fruit is to be picked. Motor 53 is connected to an electrical conductor 59 which is connected to a suitable source of electrical power for driving the motor. It should also be apparent that motor 53 may be mounted directly upon elongated bracket members 11 in such a manner that the motor may have driving gear 51 fixedly fastened to the shaft of motor 53 in driving relation with gear 20. For some operations this may prove to have certain disadvantages in that additional weight is supported at the upper end of handle 13 and therefore makes the picking apparatus somewhat more bulky and more difficult to handle. For this reason, it may be desirable to use the structure as shown in FIG. 3 to locate the motor 53 nearer the operator.

Located near the bottom of the U shaped bracket 11, is an enclosed bracket 60 which is fixedly fastened to the elongated and U shaped bracket 11 so that it extends at right angles thereto and is of sufficient length so that it will allow any of the fruit to pass therethrough when the linkages are extended to their longest dimension. Bracket 60 has a curved end 61 and a chute 62 is attached thereto which is made of flexible and pliable material such as certain types of plastics to guide the fruit to the ground in a manner to be described. Any suitable material which allows the fruit to fall freely therethrough when formed into a chute will be satisfactory as long as the chute does not damage the fruit.

FIG. 2 shows a variation of FIG. 1 which is generally used for picking fruit such as pears and avocadoes or other fruit which does not have a generally spherical shape. A concave shaped roller 114 is located at the upper end of a pair of elongated members 111 and 112 and located opposite roller 17 is a concave shaped roller 117. Roller 117 is rotatably supported by a shaft 119 which is not driven as is shaft 19, and roller 114 is rotatably supported by a shaft 118. Situated opposite roller 15 is a roller 115 rotatably supported between elongated elements 111 and 112 by a shaft 122 and opposite roller 16 is a roller 116 rotatably supported between elongated members 111 and 112 by a shaft 123. Encircling upper roller 114 and lower roller 117, is a belt 124 which is identical to belt 24 just described and situated upon belt 124 is a soft resilient material such as sponge rubber having a nonskid surface designated as 125. It will be seen that the structure urging members 111 and 112 towards U shaped elongated bracket 11 is identical to the construction and arrangement shown in FIG. 1 where the arrangement just described replaces elongated guide member 26. It will be seen that the fruit moving between the two engaging surfaces of the belt will maintain the fruit in the concave shaped area to guide the fruit between the two belts and downwardly into chute 62.

Chute 62 for each picker is connected to a container 63 by attaching the chutes 62 to a collar 64 formed in the upper edge of container 63. As indicated in FIG. 4, each of the chutes 62 may be made in sections such as 62a where each of the sections is of a predetermined length of approximately 18 to 24 inches and the sections 62a are releasably fastened to each other by suitable means such as snaps 65. The chutes are telescoped within each other so that the uppermost section is formed inwardly of the lowermost section so that the fruit will not become trapped in the seams between the joining sections 62a. The releasable snap fasteners 65 may be used to releasably fasten the lowermost section 62a to the collar 64. The collar is formed around an inlet opening 64a so that the fruit will be conveyed from the picker to container 63. Situated within container 63 are a plurality of baffle plates 66 which are connected to the sides of container 63 by suitable means such as welding or screws. The baffle plates extend downwardly and inwardly toward the center of container 63 and are located directly below the inlet openings 64a but above an opening 67 which is formed in the bottom of container 63. That is, an opening in one side of container 63 allows a box to be inserted therein, and be located below baffle plates 66 so that the fruit being directed through chutes 62 is directed into the box. A container such as container 63 would be located near each of the trees which is being picked by a group of pickers, each of which would be connected to a chute 62. The purpose in using such an arrangement is to reduce the bruises on the fruit after picking fruit from the tree and to facilitate less handling of the fruit.

In operation, the picking apparatus such as shown in FIG. 1 would be employed in picking fruit such as apples, oranges, etc. where the fruit has a generally spherically shaped configuration. Once the motor is set in operation and belt 24 is in a driving relationship such that belt 24 moves clockwise about shafts 18 and 19, the fruit is engaged by the upper portion of belt 24 and the flared out portion 28 of elongated guide member 26. Since the sponge rubber surface 25 provides a nonskid surface, the fruit is gripped and rotated about an axis transverse to the axis of the stem in the fruit. In other words, fruit is rotated so that the stem is snapped off due to the rotating action of the fruit against the elongated guide member 26. Since the fruit may have a contour which is not altogether round, the springs 45 through 48 keep a constant tension upon elongated guide member 26 to insure that the fruit is rolled over the concave surface of the work engaging area provided by the sponge rubber 29. Thus the fruit is driven to the bottom of the picker where it falls into chute 62 and is conducted downwardly where it may emerge in container 63 and be deposited in the box. It should be noted that guide member 26 remains substantially parallel to its corresponding U shaped bracket member 11 and the vertical motion is reduced to a minimum by having the linkages positioned in the manner shown in FIG. 1. It should also be noted that roller 15 is so positioned with respect to 14 and roller 16 is so positioned with respect to roller 15 that the fruit can not force belt 24 into a non-operative position so that the belt merely slips or slides over the fruit but by the proper positioning, the rollers aid in the picking operation. The rollers, if spaced a distance no greater apart than the largest diameter of the fruit to be picked, greatly aid in the movement of the fruit through the picker at the time the stem is being snapped from the tree.

The modification shown in FIG. 2 would generally be used in picking fruit which does not have a generally spherical shape, such as mentioned previously. During the picking operation, the fruit is grasped at the upper end of the picker and belts 24 and 124 cooperate to engage the fruit and merely pull it directly away from the tree since a rolling operation such as just described would cause harm to the fruit. It will be seen that because belt 124 is not driven by a power means such as through gear 20 it may vary in speed according to the contour of the fruit which moves between the two belts as the fruit is pulled downwardly. Linkages 32 through 35 are kept under tension so that the belts are urged towards each other and thereby cause the fruit to move from the top of the picker to the bottom and hence to chute 62. In order to increase the length of the chutes, it will be seen that they are provided in sections and may be easily snapped together to provide conveying chutes of varying lengths according to the distance the fruit must travel from the tree to the ground. After the boxes and container 63 are filled automatically from the fruit pickers, it is only necessary to insert a new box into container 63 to prepare for the next box full of fruit to be taken to the packing area.

From the foregoing description and discussion of my invention, it will be seen that I have provided a relatively simple and inexpensive picking apparatus for picking fruit from a tree with a minimum amount of damage to the fruit. The picker provides a positive gripping operation so that the fruit is snapped from the tree and is easily removed. Furthermore, the picker automatically adjusts itself to the different types of fruit so that it is not necessary to adjust the apparatus for use on each type of fruit being picked. By the use of the chutes to convey the fruit to the ground and the special container associated therewith, it will be seen that the fruit is actually picked and boxed in one simple operation requiring a minimum amount of labor on the part of the operator.

It will, of course, be understood that various changes may be made in the form, details, arrangement and proportions of the parts without departing from the scope of my invention which consists of the matter shown and described herein and set forth in the appended claims.

1. Apparatus for picking fruit from a tree comprising:
  (a) a bracket having elongated sides and a handle engaging portion at one end of said bracket;
  (b) a pair of work engaging devices constructed and arranged for engaging fruit therebetween and being adapted for connection to said bracket with at least one of said pair being further adapted to have power applied thereto, each of said work engaging devices having an elongated surface with a central concave portion running longitudinally thereof guiding such fruit therein;
  (c) a plurality of rotatable supporting elements extending between said sides of said bracket and rotatably supporting one of said pair of work engaging devices on said bracket;
  (d) four pair of linkages, each pair having two arms pivotally connected at one of their ends and having their other ends pivotally connecting the other of said pair of work engaging devices to said bracket;
  (e) four spring elements, each of which is connected adjacent to the ends of said arms to urge said pair of work engaging devices towards each other and keep tension applied thereto as the space between the surfaces of said pair of work engaging devices varies in accordance with the contours of such fruit therebetween;
  (f) and a power source connected to said work engaging device which is adapted therefor and causing said supporting elements to rotate with said device and move such fruit engaged thereby between said pair of devices from one end to the other.

2. The invention as set forth in claim 1 including: a flexible chute formed of pliable material attached to said bracket at the end having the handle engaging portion to collect such fruit as it is picked and moved from one end of said pair of devices to the other.

3. The invention as set forth in claim 1 including: soft resilient material having a nonskid surface fixedly fastened to said elongated surface of each of said work engaging devices to aid in moving such fruit from one end of said pair of devices to the other.

4. The invention as set forth in claim 1 wherein: all of said arms are of equal length to form said linkages of equal length.

5. The invention as set forth in claim 1 wherein: the other of said pair of work engaging devices is mounted on said bracket and is stationary relative to said one of said pair of work engaging devices to provide relative movement therebetween causing such fruit to be rotated as it moves between said pair of work engaging devices.

6. Apparatus for picking fruit from a tree, comprising:
   (a) an upwardly extending bracket having parallel sides and a handle engaging portion at the lower end thereof;
   (b) an endless flexible and stretchable belt adapted to be engaged by rollers to cause movement thereof, said belt having a work engaging surface and a width allowing operable movement between the parallel sides of said bracket;
   (c) a plurality of concave shaped rollers rotatably supported between the upwardly extending parallel sides of said bracket and encircled by said endless belt to operatively engage and support said belt in concave relationship for movement thereof, at least one of said rollers being in driving relation with said belt and adaptable to have power applied thereto;
   (d) an elongated guide member having a work engaging surface with a central concave portion formed longitudinally thereof, said member being disposed in spaced and confronting relation with said belt for engaging fruit therebetween and guiding such fruit therealong within said concave portions of said belt and guide member;
   (e) four pair of equal length linkages, each pair having two equal length arms pivotally connected at one of their ends and having their other ends pivotally connecting said elongated guide member to the parallel sides of said bracket;
   (f) four spring elements, each of which is connected adjacent to the ends of said equal length arms to urge said elongated guide member towards said belt and keep tension applied thereto as the space between said guide member and said belt varies in accordance with the contours of such fruit therebetween;
   (g) and a power source connected to said roller which is adapted therefor causing said belt to rotate and rotate such fruit along the work engaging surface of said guide member from the upper to the lower end, such fruit being rotated about an axis transverse to the stem of such fruit.

7. The invention as set forth in claim 6 wherein: a pair of said plurality of rollers are disposed at the upper and lower ends of the parallel sides of said bracket and at least another pair of said rollers are disposed near the upper end of said bracket but below the uppermost roller where each of the uppermost rollers are separated vertically from each other by a distance no greater than the smallest diameter of such fruit to be picked.

8. Apparatus for picking fruit from a tree comprising:
   (a) an upwardly extending bracket having parallel sides and a handle engaging portion at the lower end thereof;
   (b) a pair of endless flexible and stretchable belts adapted to be engaged by rollers to cause movement thereof, said belts having work engaging surfaces and widths allowing operable movement between the parallel sides of said bracket;
   (c) a first and second plurality of rollers, said first plurality of rollers being rotatably supported between the upwardly extending parallel sides of said bracket and encircled by one of said pair of endless belts to operatively engage and support said belt for movement thereof, at least one of said first plurality of rollers being in driving relation with said one belt and adaptable to have power applied thereto;
   (d) a pair of elongated members rotatably supporting said second plurality of rollers therebetween, and encircled by the other of said pair of endless belts to operatively engage and support said belt for movement thereof, said pair of belts being disposed in spaced and confronting relation with each other for engaging fruit therebetween and guiding such fruit therealong;
   (e) four pair of linkages, each pair having two arms pivotally connected at one of their ends having their other ends pivotally connecting said elongated members to the parallel sides of said bracket;
   (f) four spring elements, each of which is connected adjacent to the ends of said arms to urge said pair of belts towards each other and allow said linkages to be actuated in accordance with the contours of such fruit therebetween;
   (g) and a power source connected to said roller which is adapted therefor, causing said belt to rotate and draw such fruit along the work engaging surfaces of said belts from the upper to the lower end thereof, such fruit being moved translationally along an axis defined by the stem of such fruit.

9. The invention as set forth in claim 8 wherein:
   (h) a pair of said first plurality of rollers are disposed at the upper and lower ends of the parallel sides of said bracket and at least another pair of said rollers are disposed near the upper end of said bracket but below the uppermost roller;
   (i) and a pair of said second plurality of rollers are disposed at the upper and lower ends of the pair of elongated members and at least another pair of said rollers are disposed near the upper end of said members but below the uppermost roller, where all of the uppermost rollers of the rollers in said first and second plurality are separated vertically from each other by a distance no greater than the smallest diameter of such fruit to be picked.

10. The invention as set forth in claim 9 wherein:
   (h) said plurality of rollers are concave shaped to support said pair of endless belts in concave relationship and move such fruit between said belts and within said concave portions thereof;
   (i) and said linkages are of equal length and formed from arms of equal length keeping said belts substantially oriented in a manner to insure that such fruit is moved centrally between said concave portions of said belts.

11. Apparatus for picking fruit from a tree, comprising:
   (a) an upright bracket having parallel sides and a handle engaging portion at the lower end of said bracket;
   (b) a pair of work engaging devices constructed and arranged for engaging fruit therebetween and being adapted for connection to said bracket with at least one of said pair being further adapted to have power applied thereto, each of said work engaging devices having an elongated surface with a central concave portion running longitudinally thereof guiding such fruit therein;
   (c) a plurality of rotatable supporting elements extending between said sides of said bracket and rotatably supporting one of said pair of work engaging devices on said bracket;
   (d) four pair of linkages, each pair having two arms pivotally connected at one of their ends and having their other ends pivotally connecting the other of said pair of work engaging devices to said bracket;
   (e) four spring elements, each of which is connected adjacent to the ends of said arms to urge said pair of work engaging devices towards each other and keep tension applied thereto as the space between the surfaces of said pair of work engaging devices varies in accordance with the contours of such fruit therebetween;
(f) a power source connected to said work engaging device which is adapted therefor and causing said supporting elements to rotate with said device and move such fruit engaged thereby between said pair of devices from the upper end to the lower end;
(g) a flexible chute formed of pliable material attached to said bracket at the lower end to receive such fruit as it is picked and moved from the upper end to the lower end of said pair of devices;
(h) a container having an open top, four sides and a bottom, one of said sides having an opening formed therein to receive a box for holding such fruit being picked, an inlet opening formed in one of said four sides near said top and being of sufficient size to admit and receive such fruit being picked, a baffle plate extending inwardly and downwardly from three of said four sides to slow the movement of such fruit and being fixedly attached and disposed vertically below said inlet opening and above said opening for receiving such box;
(i) and releasable fasteners fastening said flexible chute to the inlet opening formed in said container.

12. The invention as set forth in claim 11 wherein: said flexible chute is formed from a plurality of sections releasably fastened to each other providing a chute of readily variable and changeable length as required by the height of such fruit above the ground during picking.

13. The invention as set forth in claim 12 wherein: said container has a plurality of inlet openings formed in the sides thereof, all of which are disposed vertically above said baffle plates, and where each of said inlet openings is connected to one of a plurality of said flexible chutes.

14. Apparatus for picking fruit from a tree comprising:
(a) a support bracket having a handle engaging portion and having spaced sides;
(b) a pair of work engaging devices constructed and arranged for engaging and drawing fruit therebetween and supported by said bracket with at least one of said pair being movable and adapted to have power applied thereto in driving relation to move the same relative to said bracket and thereby perform the picking action when engaging such fruit;
(c) a plurality of movable supporting elements extending between said sides of said bracket and movably supporting said movable work engaging device on said bracket;
(d) linkage extending between said pair of work engaging devices and connecting the same in spaced but adjacent relation;
(e) resilient means connected to one of said work engaging devices and urging the same toward the other of said work engaging devices to maintain the two in engaging relation to the fruit disposed therebetween during the picking action;
(f) and a power source connected in driving relation to said movable work engaging device which is adapted therefor and causing the same to engage such fruit and move the same between said pair of devices from one end to the other.

15. The structure defined in claim 14 wherein said movable supporting elements are rotatable and the work engaging device supported thereby is a continuous conveyor.

References Cited in the file of this patent
UNITED STATES PATENTS

| | | |
|---|---|---|
| 444,884 | Howell | Jan. 20, 1891 |
| 1,364,209 | Richardson | Jan. 4, 1921 |
| 2,968,141 | McGough | Jan. 17, 1961 |